United States Patent
Fuller et al.

(10) Patent No.: US 8,839,806 B2
(45) Date of Patent: Sep. 23, 2014

(54) PRESSURE TAP ASSEMBLY FOR TURBINE SYSTEM AND METHOD FOR ASSEMBLY OF A PRESSURE TAP ASSEMBLY

(75) Inventors: Fredrick Levi Fuller, Schenectady, NY (US); Wayne Armond Deyoe, Charlton, NY (US); Lawrence James Moore, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 274 days.

(21) Appl. No.: 13/420,930

(22) Filed: Mar. 15, 2012

(65) Prior Publication Data

US 2013/0240054 A1     Sep. 19, 2013

(51) Int. Cl.
*F16L 55/18*     (2006.01)
*B23P 17/04*     (2006.01)

(52) U.S. Cl.
USPC ............ 137/15.18; 137/317; 29/890.09

(58) Field of Classification Search
USPC ........... 137/317, 318, 15.12, 15.15, 15.18; 29/890.09
See application file for complete search history.

(56) References Cited

U.S. PATENT DOCUMENTS

| | | | |
|---|---|---|---|
| 4,390,041 A * | 6/1983 | Reip | 137/488 |
| 5,076,108 A | 12/1991 | Trimarchi | |
| 5,706,848 A * | 1/1998 | Taylor | 137/71 |
| 6,435,017 B1 | 8/2002 | Nowicki, Jr. | |
| 2010/0294022 A1 | 11/2010 | Yamagishi | |

FOREIGN PATENT DOCUMENTS

DE     10207058597 A1     6/2008
EP     1211498 A1         6/2002

OTHER PUBLICATIONS

Search Report and Written Opinion from corresponding EP Application No. 13158461, dated Jul. 1, 2013.

* cited by examiner

*Primary Examiner* — Kevin Lee
(74) *Attorney, Agent, or Firm* — Cantor Colburn LLP

(57) ABSTRACT

According to one aspect of the invention, a pressure tap assembly includes a passage formed through a wall, a counterbore formed in the passage proximate an inner surface of the wall and a first end of a tube positioned in the passage, wherein a spacer positioned on the tube is positioned in the counterbore and deformed about the inner surface and counterbore to prevent fluid flow between the passage and tube. The pressure tap assembly also includes a second end of the tube disposed proximate a pressure sensing device.

18 Claims, 2 Drawing Sheets

PRESSURE TAP ASSEMBLY FOR TURBINE SYSTEM AND METHOD FOR ASSEMBLY OF A PRESSURE TAP ASSEMBLY

BACKGROUND OF THE INVENTION

The subject matter disclosed herein relates to rotating machinery. More particularly, the subject matter relates to an assembly for measuring pressure in a turbine system.

In a turbine system, such as a steam turbine system, fluid flow is directed to selected portions of the turbine system to enable production of mechanical energy. Parameters relating to the fluid flow in the system may be measured to evaluate efficiency and performance for a particular turbine design. For example, pressure may be tested at selected locations in the turbine system using pressure tap assemblies. In certain locations, space for installation of the pressure tap assembly is reduced, causing difficulties when attempting to properly seal the assembly in the component. Fluid leaks at the pressure tap assembly proximate the main flow path can disrupt fluid flow, lead to measurement errors and reduce the accuracy of turbine efficiency calculations.

BRIEF DESCRIPTION OF THE INVENTION

According to one aspect of the invention, a pressure tap assembly includes a passage formed through a wall, a counterbore formed in the passage proximate an inner surface of the wall and a first end of a tube positioned in the passage, wherein a spacer positioned on the tube is positioned in the counterbore and deformed about the inner surface and counterbore to prevent fluid flow between the passage and tube. The pressure tap assembly also includes a second end of the tube disposed proximate a pressure sensing device.

According to another aspect of the invention, a method for assembling a pressure tap assembly includes forming a passage through a wall, forming a counterbore in the passage proximate an inner surface of the wall, positioning a spacer on a tube and positioning a first end of the tube in the passage. The method further includes positioning the spacer on the tube in the counterbore and deforming the spacer about the inner surface and counterbore to prevent fluid flow between the passage and tube and positioning a pressure sensing device proximate a second end of the tube.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Although the following discussion primarily focuses on steam turbines, the concepts discussed are not limited to steam turbines and may apply to any suitable machinery, including gas turbines. Accordingly, the discussion herein is directed to steam turbine embodiments, but may apply to other rotating machinery.

Figure 1:
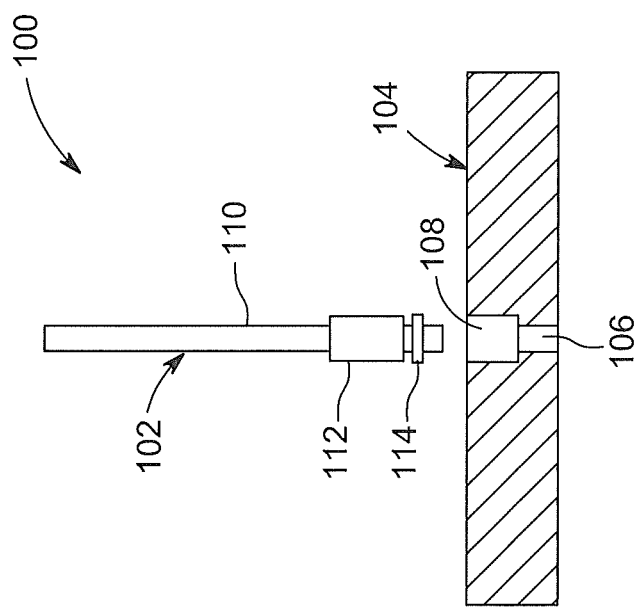
FIG. 1 is a side view of a portion of a turbine assembly including a pressure tap assembly according to an embodiment.

FIG. 1 is a side view of a portion of a turbine assembly 100 according to an embodiment. The turbine assembly 100 includes a pressure tap assembly 102 for installation in a wall 104 of a turbine component. A passage 106 and counterbore 108 are formed in the wall 104 to receive the pressure tap assembly 102. The pressure tap assembly 102 includes a tube 110, a spacer 112 and a gasket 114. In an embodiment, the spacer 112 is a cylindrical sleeve member that slides onto the tube 110. During assembly, the spacer 112 is located and secured at a selected position along the tube 110 by a suitable method, such as crimping. The spacer 112 is secured on the tube 110 to prevent or reduce fluid flow between the spacer 112 and tube 110 after installation of the pressure tap assembly 102. After securing the spacer 112 the gasket 114 is positioned on the tube 110, where the gasket 114 slides along the tube 110, but remains between the spacer 112 and a portion of the counterbore 108 to reduce or prevent fluid flow between the pressure tap assembly 102 and the passage 106.

The gasket 114 may be formed from a suitable durable material to provide sealing properties at high temperatures, such as one or more graphite sheets. In an embodiment, the gasket 114 is a disk shape graphite member that is punctured as the gasket 114 placed on the tube 110. The gasket 114 is then slid into position before insertion of the tube 110 in the passage 106. In another embodiment, the gasket 114 may be placed in the counterbore 108 and is then punctured and positioned on the tube 110 as it is inserted in the passage 106. The spacer 112 may be made from any suitable durable material that can be deformed to provide the desired sealing properties and characteristics described herein, such as a brass material. In one embodiment, the tube 110 is a substantially hollow cylindrical member configured to provide fluid communication from the main flow path within the turbine component to a sensor device. In embodiments, the tube 110 is made from a steel alloy.

Figure 2:
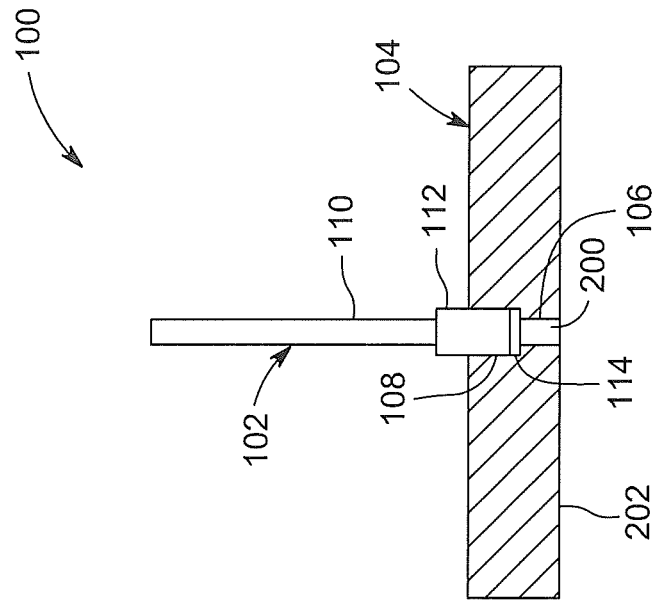
FIG. 2 is a side view of the turbine assembly shown in FIG. 1 with the pressure tap assembly inserted in a wall.

FIG. 2 is a side view of the turbine assembly 100 from FIG. 1 with the pressure tap assembly 102 inserted in the passage 106. Specifically a first end 200 of the tube 110, gasket 114 and spacer 112 are positioned in the passage 106. The counterbore 108 is configured to receive the gasket 114 and spacer 112. In an embodiment, a portion of the first end 200 may protrude from a surface 202 of the wall 104 after insertion, where the protruding portion is removed after installation to provide a smooth profile for the surface 202 and tube 110 that does not disrupt fluid flow. In embodiments, the tube 110 is not threadably coupled to the passage 106. In one embodiment, the tube 110 is press fit into the passage 106.

Figure 3:
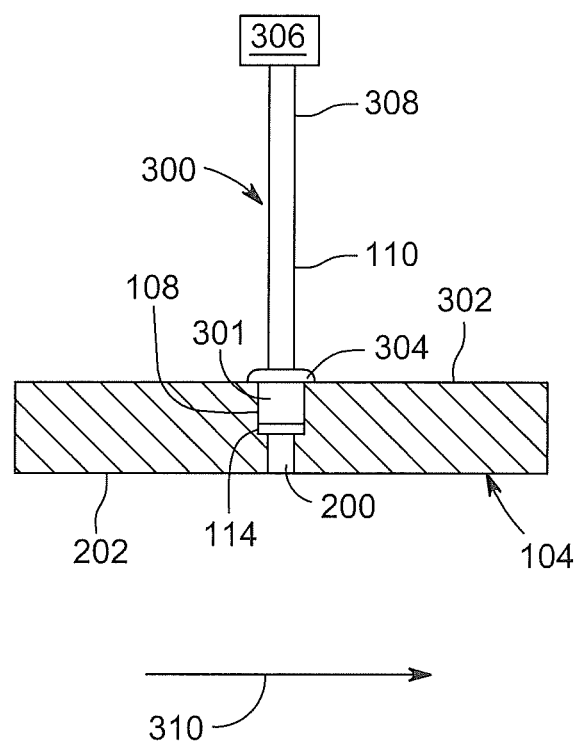
FIG. 3 is a side view of the turbine assembly shown in FIGS. 1 and 2 with a spacer of the pressure tap assembly deformed about a portion of the wall.

FIG. 3 is a side view of the turbine assembly 100 from FIGS. 2 and 3 showing an installed pressure tap assembly 300. The pressure tap assembly 300 includes a partially deformed spacer 301, gasket 114 and a sensor device 306 positioned proximate a second end 308 of the tube 110. The deformed spacer 301 includes a lip 304 formed by forcing a portion of the spacer 301 axially (along the tube 110 axis) and radially into a surface 302 of the wall 104. In an embodiment, the surface 302 (also referred to as "inner surface") is machined to provide a smooth surface for contacting the deformed spacer 301. The sensor device 306 is in fluid communication with a main flow path 310 (e.g., steam flow path)

via the tube 110 to determine pressure of the fluid in the turbine region proximate the pressure tap assembly. In an embodiment, deforming the spacer 301 to form the lip 304 prevents or reduces fluid flow between the tube 110 and the passage 106, thereby improving the accuracy of measurements taken by the sensor device 306. The spacer 301 may be deformed by any suitable method, such as by using a mashing tool with a hardened tip, where a material of the hardened tip is harder than the spacer 301 material. In an embodiment, the deforming tool causes the spacer 301 and gasket 114 to substantially fill voids within the counterbore 108 to further reduce fluid flow through the passage 106. Accordingly, the pressure tap assembly 300 reduces leakage of fluid from the main flow path 310 to improve testing and evaluation of turbine performance. Specifically, reduced fluid leaks at the pressure tap assembly 300 leads to less fluid flow disruptions and reduced measurement errors, thereby improving the accuracy of turbine efficiency calculations.

The arrangement of the pressure tap assembly 300 reduces fluid flow between the passage 106 and the tube 110 at elevated temperatures ranging from about 400 to about 800 degrees Fahrenheit, thereby enabling improved pressure measurements to accurately determine turbine performance. In an embodiment, a turbine system including the turbine assembly 100 is a scale turbine test system configured for testing turbine design performance. For example, the turbine assembly 300 can be installed in a ½, ⅓, ¼ or less scale turbine system (relative to production turbines) constructed to test and evaluate turbine designs. A plurality of pressure tap assemblies may be positioned throughout the turbine system, where the reduced leaking or fluid flow across the pressure tap assembly 300 provides improved measurements for the system. The depicted pressure tap assembly 300 provides a method and assembly for installation in tight locations within the turbine system, where the reduced space can cause installation to be difficult and can be difficult to use other techniques to prevent fluid leakage. In embodiments, the pressure tap assembly 300 is installed in the wall 104 of a stationary turbine component, such as a diaphragm or nozzle portion of a turbine system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A pressure tap assembly comprising:
a passage formed through a wall of a stationary component of a turbine system;
a counterbore formed in the passage proximate an inner surface of the wall;
a first end of a tube positioned in the passage, wherein a spacer positioned on the tube is positioned in the counterbore and deformed about the inner surface and counterbore to prevent fluid flow between the passage and tube; and
a second end of the tube disposed proximate a pressure sensing device.

2. The assembly of claim 1, comprising a gasket positioned between the spacer and counterbore.

3. The assembly of claim 2, wherein the gasket comprises a graphite gasket.

4. The assembly of claim 1, wherein an outer surface of the wall is exposed a main flow path.

5. The assembly of claim 1, wherein the pressure tap assembly is configured to prevent fluid flow between the passage and tube below a turbine operating temperature of about 800 degrees Fahrenheit.

6. The assembly of claim 1, wherein the passage and tube are not threadably coupled.

7. The assembly of claim 1, wherein the pressure tap assembly is part of a turbine system that less than about ½ scale relative to a production turbine system and the pressure tap assembly is configured to test turbine efficiency using the pressure sensing device.

8. The assembly of claim 1, wherein the spacer comprises a brass spacer.

9. The assembly of claim 1, wherein the spacer is deformed about the counterbore to substantially fill voids in counterbore to prevent fluid flow.

10. A method for assembling a pressure tap assembly, the method comprising:
forming a passage through a wall of a stationary component of a turbine system;
forming a counterbore in the passage proximate an inner surface of the wall;
positioning a spacer on a tube;
positioning a first end of the tube in the passage;
positioning the spacer on the tube in the counterbore and deforming the spacer about the inner surface and counterbore to prevent fluid flow between the passage and tube; and
positioning a pressure sensing device proximate a second end of the tube.

11. The method of claim 10, comprising positioning a gasket between the spacer and counterbore.

12. The method of claim 11, wherein positioning the gasket between the spacer and counterbore comprises positioning a graphite gasket between the spacer and counterbore.

13. The method of claim 10, wherein deforming the spacer about the counterbore to prevent fluid flow through the passage comprises preventing fluid flow between the passage and tube below a turbine operating temperature of about 800 degrees Fahrenheit.

14. The method of claim 10, wherein the pressure tap assembly is part of a turbine system that is ½ scale or less relative to a production turbine system and the pressure tap assembly is configured to test turbine efficiency using the pressure sensing device.

15. The method of claim 10, wherein positioning the spacer on the tube comprises crimping the spacer to the tube to fix a position of the spacer on the tube.

16. The method of claim 15, wherein positioning the spacer on the tube comprises crimping a brass spacer to the tube.

17. The method of claim 10, wherein deforming the spacer comprises deforming the spacer to substantially fill voids in the counterbore to prevent fluid flow.

18. A method for assembling a pressure tap assembly, the method comprising:
forming a passage through a wall;
forming a counterbore in the passage proximate an inner surface of the wall;
positioning a spacer on a tube;
positioning a graphite gasket between the spacer and counterbore;

positioning a first end of the tube in the passage; and
positioning the spacer on the tube in the counterbore and deforming the spacer about the inner surface and counterbore to prevent fluid flow between the passage and tube.

* * * * *